June 15, 1937.  C. W. JOHNSON  2,084,255
SQUEEZE GATE
Filed Jan. 24, 1936  4 Sheets-Sheet 2

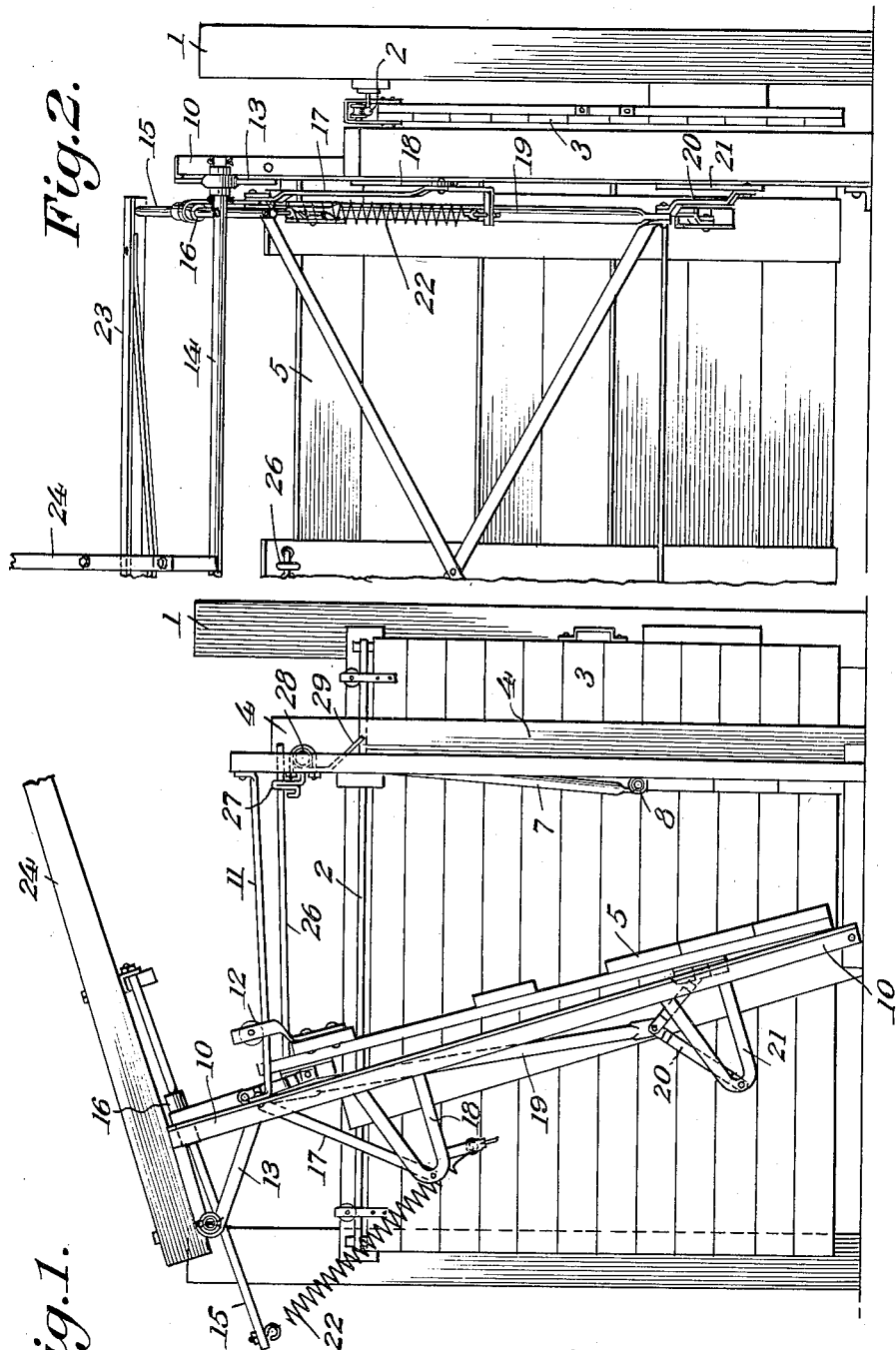

Carl W. Johnson, INVENTOR
BY Victor J. Evans & Co.
ATTORNEYS

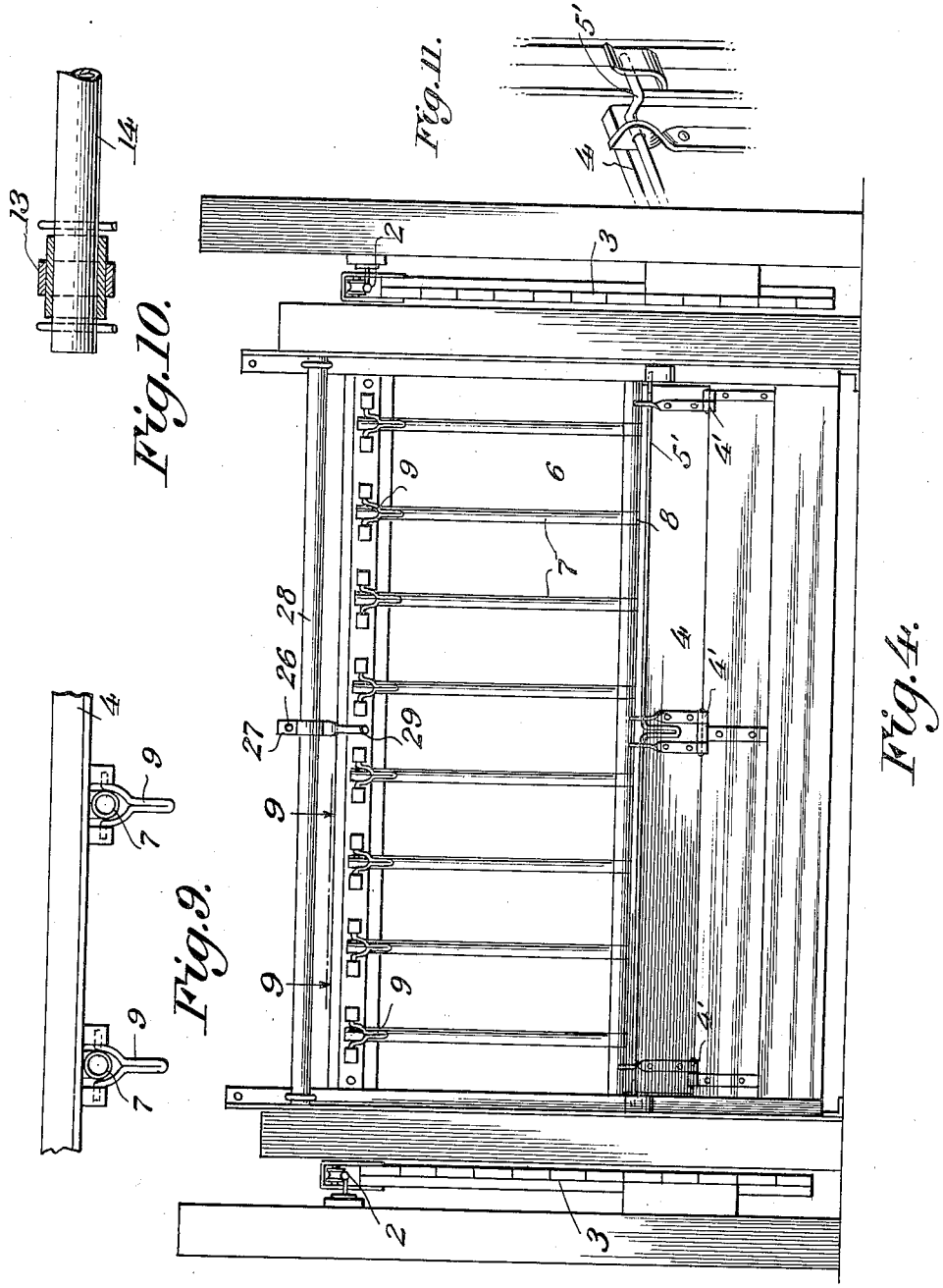

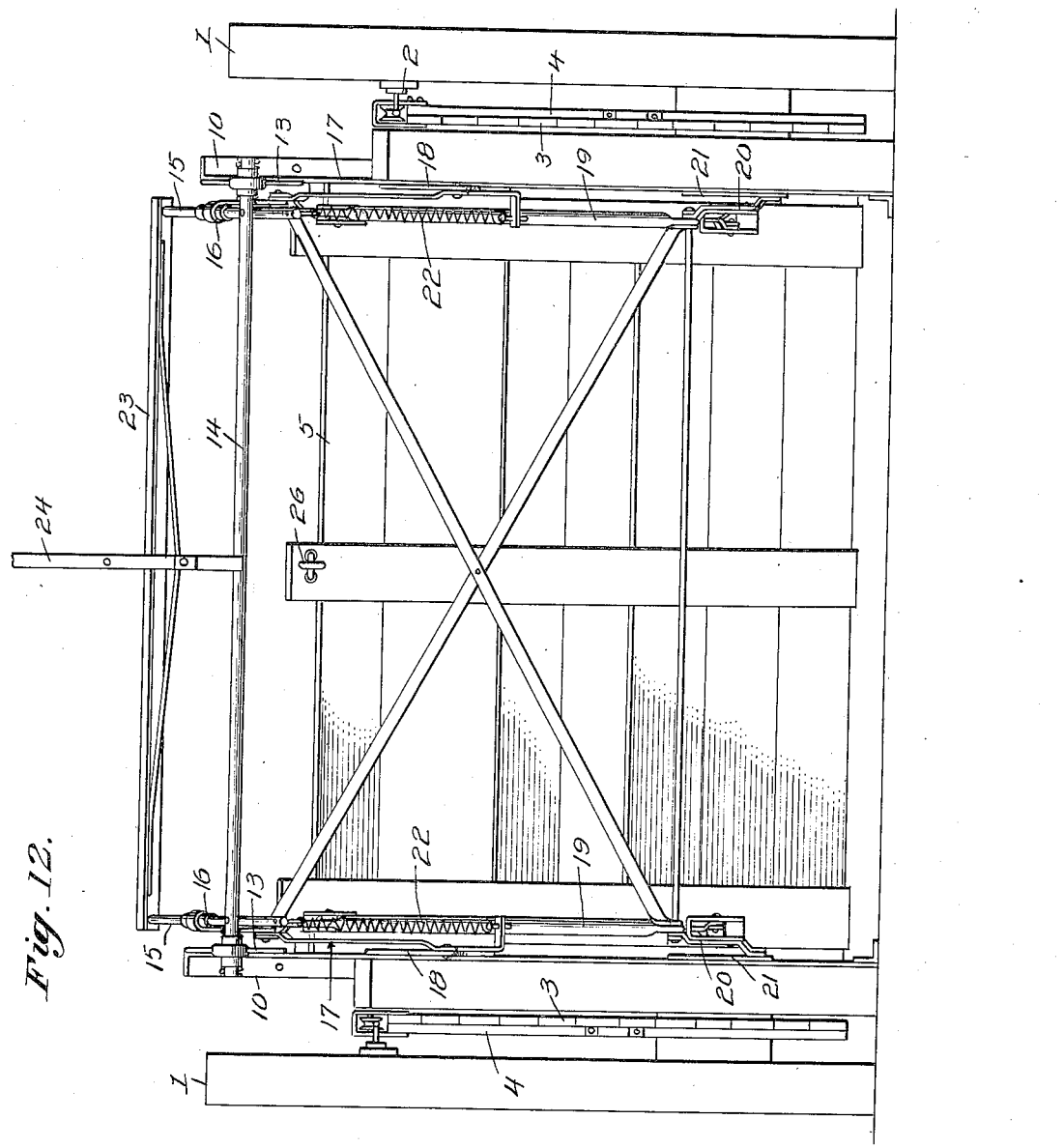

Patented June 15, 1937

2,084,255

UNITED STATES PATENT OFFICE 2,084,255

SQUEEZE GATE

Carl W. Johnson, Sheridan, Wyo.

Application January 24, 1936, Serial No. 60,681

3 Claims. (Cl. 119—98)

This invention relates to squeeze gates for holding or restraining cattle or animals of any kind to permit branding and other operations to be easily and quickly accomplished without danger to the operator, and has for the primary object the provision of a device of this character which will provide ample space for a steer or like animal to enter or leave therefrom when in released position and which may be easily actuated to secure the animal's body against movement and which is self-locking in any of its adjusted positions when being actuated into restraining position and may be readily released when desired.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is an end elevation illustrating a squeeze gate constructed in accordance with my invention.

Figure 2 is a fragmentary rear elevation illustrating the device.

Figure 4 is a front elevation illustrating the device.

Figure 8 is a detail sectional view showing the locking means for the removable wall.

Figure 9 is a sectional view taken on the line 9—9 of Figure 4.

Figure 10 is a detail sectional view taken on the line 10—10 of Figure 3.

Figure 11 is a detail view illustrating a latch for securing a hinged panel of the wall of the device in a closed position.

Figure 12 is a rear elevation illustrating the device.

Figure 7:
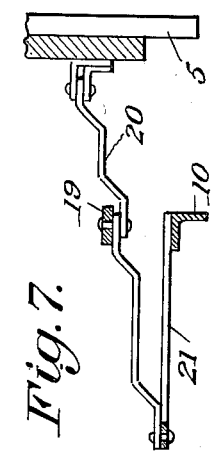
Figure 7 is a sectional view taken on the line 7—7 of Figure 6.
Figure 6:
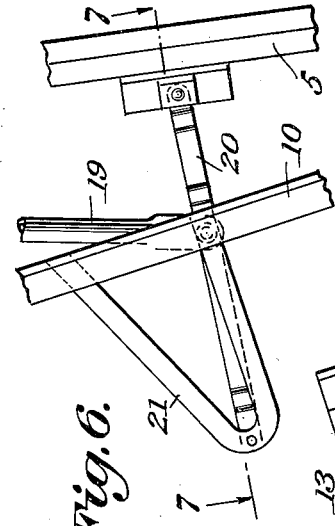
Figure 6 is an enlarged fragmentary view showing linkage connecting the operating mechanism with the lower portion of the movable wall.
Figure 5:
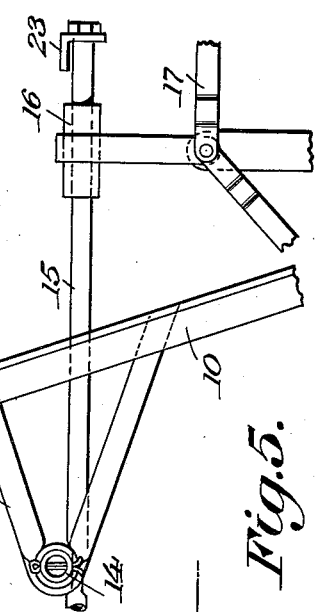
Figure 5 is an enlarged fragmentary view showing a part of the operating mechanism connected with the movable wall of the device.
Figure 3:
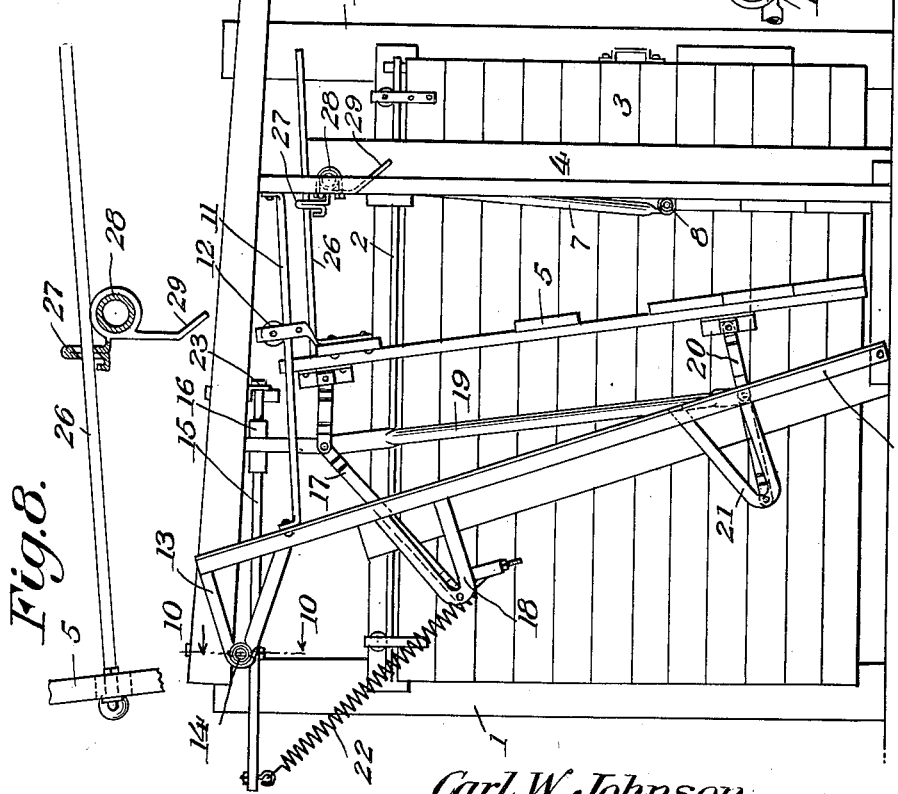
Figure 3 is a view similar to Figure 1, showing the device adjusted into restraining position.

Referring in detail to the drawings, the numeral 1 indicates supporting posts arranged in pairs and each pair having connected thereto tracks 2 on which are slidably mounted end gates 3. Arranged between the end gates 3 is a fixed vertically arranged wall 4 and a movable or squeeze wall 5 adapted, through the operation of a mechanism which will be hereinafter more fully described, to be moved towards and from the fixed wall 4. By opening either of the gates 3 a steer or like animal may be driven between the fixed and movable walls 4 and 5 and with the gates in closed position, the animal is trapped in a standing position and to restrain movement of the body of the animal the wall 5 is moved towards the wall 4. The wall 4 has an opening 6 therein over which extend spaced bars 7. The lower ends of the bars 7 are hingedly mounted, as shown at 8, while the upper ends are detachably secured by pivotally mounted clips 9 so that any one or a number of the bars may be swung to a lowered position, giving the operator access to the side of the animal held in the restrained position by the walls 4 and 5.

An upwardly inclined supporting frame 10 is suitably secured to the device rearwardly of the movable wall 5 and has connected thereto tracks 11 which are also secured to the fixed wall 4. The movable wall 5 is mounted to slide on the tracks 11, as shown at 12. Brackets 13 are secured to the upper ends of the frame 10 and have journaled thereto a bar 14 to which are secured rods 15 extending forwardly and rearwardly thereof. Sleeves 16 are slidably mounted on the rods 15 and are pivoted to toggles 17. The toggles 17 are pivoted to the movable wall 5 and to brackets 18 secured to the frame 10. Push rods 19 are pivoted to the toggles 17 and to toggles 20. The toggles 20 are pivoted to the movable wall 5 and to brackets 21 secured to the frame 10. The toggles 20 are arranged below the toggles 17 and said toggles each include sections which when moved in one direction increase the length of the toggles and when moved in an opposite direction decrease the length of the toggles. The rear ends of the rods 15 have coil springs 22 connected thereto and said springs are connected to the brackets 18. The rods 15 are connected by a bar 23 and secured to said bar 23 and to the bar 14 is an operating lever 24 which extends forwardly of the fixed wall 4 and has connected to its forward end a pull cable 25. The springs 22 act to position the operating lever 24, as shown in Figure 1, with the movable wall 5 moved rearwardly away from the fixed wall 4 so that an animal may enter the space defined by the walls 4 and 5. A downward pull upon the operating lever 24 causes the bar 14 to rock and the sleeves 16 to slide on the rods 15, causing a downward movement of the connecting bars 19.

Said movement of the connecting bars increases the length of the toggles 17 and 20 causing the movable wall 5 to be moved towards the fixed wall 4 and thereby grip the body of the animal.

A securing rod 26 is suitably secured to the upper portion of the movable wall 5 and slides through a keeper 27, the latter being journaled on a bar 28 carried by the fixed wall 4. The keeper has an opening through which the securing rod 26 slides and the walls of said opening are angularly disposed whereby said rod 26 is capable of sliding freely in one direction and will be automatically held against sliding movement in an opposite direction until the keeper 27 has its position shifted on the bar 28 through the manipulation of a finger piece 29. During the downward movement of the operating bar 24 to move the wall 5 towards the wall 4, the securing rod 26 slides freely in the keeper 27. However, when the bar 24 is released and the springs 22 act to restore the operating bar 24 to its initial position, the angular walls of the keeper 27 grip the securing bar 26 and prevent the movable wall 5 from moving away from the fixed wall 4. The securing rod 26 may be readily released by operating the finger piece 29 so that the springs 22 can return the operating bar 24 to its initial position and the wall 5 away from the wall 4 and thereby permit release of the animal.

The wall 4 of this device below the bars 7 is composed of a series of panels, one of which is hingedly mounted, as shown at 4', so that it may be swung downwardly to allow a person standing exteriorly of the device to reach within the wall for the purpose of performing an operation on the animal confined by the device. A suitable latch mechanism 5' is provided for holding the hinged panel in a closed position.

Having described the invention, I claim:

1. A squeeze gate comprising a supporting structure, a fixed wall carried by said supporting structure, a supporting frame carried by said supporting structure, a movable wall arranged between the supporting frame and the fixed wall and adapted to be moved towards and from the latter, toggles pivotally connected to the movable wall and to the supporting frame, a bar journaled to the supporting structure, rods secured to said bar, sleeves slidable on said rods, connecting bars connecting said sleeves to said toggles, and an operating means for effecting oscillation of the bar.

2. A squeeze gate comprising a supporting structure, a fixed wall carried by said supporting structure, a supporting frame carried by said supporting structure, a movable wall arranged between the supporting frame and the fixed wall and adapted to be moved towards and from the latter, toggles pivotally connected to the movable wall and to the supporting frame, a bar journaled to the supporting structure, rods secured to said bar, sleeves slidable on said rods, connecting bars connecting said sleeves to said toggles, an operating bar secured to said first bar and to said rods, and springs connected to said rods and to the supporting frame acting normally to urge the movable wall away from the fixed wall.

3. A squeeze gate comprising a supporting structure, a fixed wall carried by said supporting structure, a supporting frame carried by said supporting structure, a movable wall arranged between the supporting frame and the fixed wall and adapted to be moved towards and from the latter, toggles pivotally connected to the movable wall and to the supporting frame, a bar journaled to the supporting structure, rods secured to said bar, sleeves slidable on said rods, connecting bars connecting said sleeves to said toggles, an operating bar secured to said first bar and to said rods, springs connected to said rods and to the supporting frame acting normally to urge the movable wall away from the fixed wall, a securing rod connected to said operating bar, a keeper receiving said securing rod and secured to the fixed wall for automatically locking the movable wall in any of its positions towards the fixed wall, said fixed wall having an opening, hinged bars to traverse said opening, and clips for releasably securing the last-named bars in position to traverse the opening.

CARL W. JOHNSON.